（12）United States Patent
Sheng et al.

(10) Patent No.: US 9,135,082 B1
(45) Date of Patent: Sep. 15, 2015

(54) TECHNIQUES AND SYSTEMS FOR DATA RACE DETECTION

(75) Inventors: Tianwei Sheng, San Diego, CA (US); Neil A. Vachharajani, San Francisco, CA (US); Stephane Eranian, Grenoble (FR); Robert Hundt, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 474 days.

(21) Appl. No.: 13/112,945

(22) Filed: May 20, 2011

(51) Int. Cl.
*G06F 9/44* (2006.01)
*G06F 9/52* (2006.01)
*G06F 11/36* (2006.01)
*G06F 9/45* (2006.01)

(52) U.S. Cl.
CPC .............. *G06F 9/524* (2013.01); *G06F 8/458* (2013.01); *G06F 11/36* (2013.01)

(58) Field of Classification Search
CPC .............. G06F 11/24–11/3696; G06F 8/314
USPC .................. 717/101–178; 712/220, 225, 227; 714/100–824
See application file for complete search history.

(56) References Cited

U.S. PATENT DOCUMENTS

| | | | | |
|---|---|---|---|---|
| 5,434,997 | A * | 7/1995 | Landry et al. | 714/12 |
| 6,381,628 | B1 * | 4/2002 | Hunt | 709/201 |
| 7,752,605 | B2 * | 7/2010 | Qadeer et al. | 717/127 |
| 8,103,861 | B2 * | 1/2012 | Klecka et al. | 712/244 |
| 8,200,474 | B2 * | 6/2012 | Wang et al. | 703/22 |
| 8,418,146 | B2 * | 4/2013 | Musuvathi et al. | 717/128 |
| 8,510,604 | B2 * | 8/2013 | Eilebrecht | 714/38.1 |
| 8,813,038 | B2 * | 8/2014 | Erickson et al. | 717/126 |
| 2001/0052053 | A1 * | 12/2001 | Nemirovsky et al. | 711/138 |
| 2003/0061445 | A1 * | 3/2003 | Birk et al. | 711/118 |
| 2005/0071816 | A1 * | 3/2005 | Levine et al. | 717/127 |
| 2006/0224873 | A1 * | 10/2006 | McCormick et al. | 712/244 |
| 2006/0248321 | A1 * | 11/2006 | Klecka et al. | 712/244 |
| 2006/0248322 | A1 * | 11/2006 | Southgate et al. | 712/244 |
| 2007/0234118 | A1 * | 10/2007 | Sardella et al. | 714/23 |
| 2007/0245312 | A1 * | 10/2007 | Qadeer et al. | 717/124 |
| 2010/0131931 | A1 * | 5/2010 | Musuvathi et al. | 717/128 |
| 2011/0083122 | A1 * | 4/2011 | Chen et al. | 717/124 |
| 2011/0219208 | A1 * | 9/2011 | Asaad et al. | 712/12 |

(Continued)

OTHER PUBLICATIONS

Effective Data-Race Detection for the Kernel—John Erickson, Madanlal Musuvathi, Sebastian Burckhardt, Kirk Olynyk—Microsoft Research—OSDI, 2010.*

(Continued)

*Primary Examiner* — Lewis A Bullock, Jr.
*Assistant Examiner* — Francisco Aponte
(74) *Attorney, Agent, or Firm* — Fish & Richardson P.C.

(57) ABSTRACT

A race detection mechanism can include running threads of a multithreaded program on a processor, the program being configured to produce locksets each of which indicate a set of one or more locks that a thread holds at a point in time. The mechanism can cause a performance monitoring unit included in the processor to monitor memory accesses caused by the threads and to produce samples based on the memory accesses, the samples being indicative of an accessed memory location. The mechanism can detect an existence of a data race condition based on the samples and the locksets. Detecting can include identifying a protected access to a memory location by a first thread of the threads and identifying an unprotected access to the memory location by a second thread of the threads. The process selectively outputs an indication of the data race condition.

15 Claims, 7 Drawing Sheets

(56) References Cited

U.S. PATENT DOCUMENTS

2011/0320745 A1\* 12/2011 Zhang et al. .................. 711/154
2012/0204062 A1\* 8/2012 Erickson et al. ................ 714/35

OTHER PUBLICATIONS

LiteRace: Effective Sampling for Lightweight Data-Race Detection—Daniel Marino, University of California, Los Angeles—Madanlal Musuvathi, Microsoft Research, Redmond—Satish Narayanasamy, University of Michigan, Ann Arbor—PLDI'09, Jun. 15-20, 2009.\*
Arnold et al., "QVM: an efficient runtime for detecting defects in deployed systems. In Gail E. Harris, editors, Proceedings of the 23rd Annual ACM SIGPLAN Conference on Object-Oriented Programming, Systems, Languages, and Applications," OOPSLA 2008, Oct. 19-23, 2008, Nashville, TN, USA, pp. 143-162, 20 pages.
Bond et al., "Pacer: Proportional Detection of Data Races," PLDI, Jun. 5-10, 2010, Toronto, Ontario, Canada, 14 pages.
Burckhardt et al., "A Randomized Scheduler With Probabilistic Guarantees of Finding Bugs," 2010, ASPLOS, pp. 167-178, AMC, 14 pages.
Cadar et al., "KLEE: Unassisted and Automatic Generation of High-Coverage Tests for Complex Systems Programs," 2008, OSDI, pp. 209-224, 14 pages.
Chen et al., "Taming Hardware Event Samples for FDO Compilation," Apr. 24-28, 2010, Code Generation and Optimization (CGO), ACM, 11 pages.
Dean et al., "ProfileMe: Hardware Support for Instruction-Level Profiling on Out-of-Order Processors," Dec. 1-3, 1997, Micro, IEEE, Proceedings of Micro-30 in Research Triangle Park, North Carolina, pp. 292-302, 12 pages.
Engler et al., "RacerX: effective, static detection of race conditions and deadlocks," 2003, Proceedings of the nineteenth ACM symposium on Operating systems principles, pp. 237-252, New York, 16 pages.
Flanagan et al., "FastTrack: efficient and precise dynamic race detection," Jun. 15-20, 2009, PLDI, ACM, pp. 121-133, 13 pages.
Jula et al., "Deadlock Immunity: Enabling Systems to Defend Against Deadlocks," 8th USENIX Symposium on Operating Systems Design and Implementation, OSDI 2008, Dec. 8-10, 2008, San Diego, California, USA, Proceedings, pp. 295-308, 14 pages.
Lu et al., "AVIO: Detecting Atomicity Violations Via Access Interleaving Invariants," Oct. 21-25, 2006, ASPLOS, ACM, pp. 37-48, 12 pages.
Lu et al., "Learning From Mistakes: A Comprehensive Study on Real World Concurrency Bug Characteristics," Mar. 1-5, 2008, ASPLOS, ACM, pp. 329-339, 11 pages.
Marino et al., "Literace: Effective Sampling for Lightweight Data-Race Detection," Jun. 15-20, 2009, PLDI, ACM, pp. 134-143, 10 pages.
Musuvathi et al., "Finding and Reproducing Heisenbugs in Concurrent Programs," Dec. 8-10, 2008, 8th USENIX Symposium on Operating Systems Design and Implementation, OSDI 2008, San Diego, California, USA, Proceedings, pp. 267-280, 14 pages.
Muzahid et al., "Sigrace: Signature-Based Data Race Detection," Jun. 20-24, 2009, in Stephen W. Keckler and Luiz Andr Barroso, editors, ISCA, ACM, pp. 337-348, 12 pages.
O'Callahan et al., "Hyrbid Dynamic Data Race Detection," Jun. 11-13, 2003, San Diego, California, ACM, pp. 167-178, 12 pages.
Park et al., "Ctrigger: Exposing Atomicity Violation Bugs From Their Hiding Places," Mar. 7-11, 2009, Washington, DC, ASPLOS, ACM, pp. 25-36, 12 pages.
Pozniansky et al., "Multirace: Efficient On-The-Fly Data Race Detection in Multithreaded C++ Programs," Jun. 11-13, 2003, San Diego, California, PPoPP, ACM, 12 pages.
Qin et al., "RX: Treating Bugs As Allergies—A Safe Method to Survive Software Failures," Oct. 23-26, 2005, Brighton, UK, SOSP, ACM, pp. 235-248, 14 pages.
Sack et al., "Accurate and Efficient Filtering for the Intel Thread Checker Race Detector," Oct. 21, 2006, San Jose, California, ASID, ACM, pp. 34-41, 8 pages.
Savage et al., "Eraser: A Dynamic Data Race Detector for Multithreaded Programs," Nov. 1997, ACM Trans. Comput. Syst, 15(4):391-411, 21 pages.
Sen, Koushik, "Race directed random testing of concurrent programs," Jun. 7-13, 2008, PLDI, AMC, pp. 11-21, 11 pages.
Serebryany et al., "ThreadSanitizer—Data Race Detection in Practice," Workshop on Binary Instrumentation and Applications, Dec. 12, 2009, New York City, NY, ACM, 10 pages.
Shye et al., "Code Coverage Testing Using Hardware Performance Monitoring Support," Sep. 19-21, 2005, Monterey, California, AADEBUG, ACM, pp. 159-163, 5 pages.
Voung et al., "Relay: Static Race Detection on Millions of Lines of Code," Sep. 3-7, 2007, Cavtat, Dubrovnik, Croatia, ESEC/SIGSOFT FSE, ACM, pp. 205-214, 10 pages.
Zhang et al., "Conmem: Detecting Severe Concurrency Bugs Through an Effect-Oriented Approach," Mar. 13-17, 2010, Pittsburgh, Pennsylvania, ASPLOS, ACM, pp. 179-192, 13 pages.
Zhou et al., "HARD: Hardware-Assisted Lockset-based Race Detection," 2007, HPCA, pp. 121-132, 12 pages.

\* cited by examiner

IP1: Lock (instrumented to produce a lock event)
IP2: ...
IP3: Unlock (instrumented to produce an unlock event)
IP4: ...

TECHNIQUES AND SYSTEMS FOR DATA RACE DETECTION

TECHNICAL FIELD

This patent document relates to detecting data races in computer programs.

BACKGROUND

Multithreaded programming can increase the performance of an application. For example, a multithreaded program, when executed, can launch multiple threads to distribute work, e.g., distribute the handling of incoming server requests. Moreover, the dominance of concurrent processors, such as multithreaded processors and multi-cored processors, has made parallel programming advantageous to achieve peak performance from modern systems. Parallel programming can include generating a multi-thread program that launches multiple threads on multiple cores when executed. Multithreaded programming can be considerably more difficult to program than its single threaded counterpart. In addition to bugs common to sequential computer programs, multithreaded programming may produce bugs such as data races, atomicity violations, deadlock, and live lock.

SUMMARY

This document describes data race detection technologies. A described method for data race detection includes running threads of a multithreaded program on a processor, the program being configured to produce locksets each of which indicate a set of one or more locks that a thread holds at a point in time; causing a performance monitoring unit included in the processor to monitor memory accesses caused by the threads and to produce samples based on the memory accesses, the samples being indicative of an accessed memory location; detecting an existence of a data race condition based on the samples and the locksets; and selectively outputting an indication of the data race condition. Other implementations can include corresponding systems, apparatus, and computer programs, configured to perform the actions of the methods, encoded on computer storage devices.

These and other implementations can include one or more of the following features. Detecting an existence of a data race condition can include identifying a protected access to a memory location by a first thread of the threads and identifying an unprotected access to the memory location by a second thread of the threads. Implementations can include selecting a sample of the samples and determining one or more additional memory accesses based on register file information included in the selected sample and one or more associated basic blocks of the program. The selected sample can correspond to a memory reference instruction within the one or more associated basic blocks. Detecting the existence of the data race condition can include using the one or more additional memory accesses. Implementations can include obtaining memory allocation events associated with the program. Detecting the existence of the data race condition can include using at least a portion of the memory allocation events. Implementations can include controlling a sampling rate of the performance monitoring unit based on an overhead parameter. Implementations can include configuring a size of a buffer of the performance monitoring unit to store a single sample such that an interrupt occurs based on the performance monitoring unit writing a single sample to the buffer. Running the threads can include running multiple instances of the application on one or more servers. Detecting the existence of the data race condition can include aggregating performance monitoring unit data generated by running the multiple instances of the application.

A system for detecting data races can include a computer storage device having instructions stored thereon and a processor coupled to the computer storage device, the processor including a performance monitoring unit, where the instructions, when executed by the processor, cause the processor to perform operations. The operations can include running threads of a multithreaded program on the processor, the program being configured to produce locksets each of which indicate a set of one or more locks that a thread holds at a point in time; causing the performance monitoring unit to monitor memory accesses caused by the threads and to produce samples based on the memory accesses, the samples being indicative of an accessed memory location; detecting an existence of a data race condition based on the samples and the locksets; and selectively outputting an indication of the data race condition. The detecting can include identifying a protected access to a memory location by a first thread of the threads and identifying an unprotected access to the memory location by a second thread of the threads.

Particular embodiments of the subject matter described in this document can be implemented so as to realize one or more of the following advantages. A described data race detection mechanism can be lightweight, non-invasive, and usable in a production environment, e.g., a server that is actively handling requests from customers. The described data race detection mechanism can obtain memory addresses via the performance monitoring unit, which is faster than using instrumented memory operations, e.g., memory operations that are augmented with additional instructions to capture the memory addresses at run-time. The described data race detection mechanism can dynamically adjust sampling rates to meet latency requirements of a production environment.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Computer programming bugs, such as data races, are difficult to debug and are a source of unreliability in multithreaded applications. A data race occurs, for example, when multiple threads access the same location without proper synchronization, and at least one of the accesses is a write. Data races are difficult to diagnose for two primary reasons. First they can manifest under certain, potentially rare, thread interleaving conditions. This can make data race bugs difficult to reproduce. Second, the actual data race typically only corrupts data. User visible effects, such as program crashes or corrupted output, may occur much later making it difficult to isolate where in the computer program the race actually occurred. Traditional debuggers may prove inadequate in locating a data race. Tools developed both in industry and academia have been proposed to help find data races. Data races detection tools can analyze information on an application's synchronization operations and memory reference addresses to detect a data race. Traditional race detection tools use instrumented synchronization operations and instrumented memory reference operations. The tools collect data from the instrumentation and apply race detection algorithms for online or postmortem analysis. Such tools can introduce significant runtime overhead, can be extremely invasive, or both, which can render the tools unsuitable for use in production systems. Consequently, these tools are typically used during application testing where many data races go undetected due to limited input sets and incomplete modeling of the real runtime environment.

This document describes, among other things, a data race detection (DRD) mechanism based on a processor's performance monitor unit (PMU). The DRD mechanism can be used in production systems that are sensitive to overhead. The PMU can support a very low overhead sampling mechanism and record memory address information when a memory operation is sampled by PMU. DRD mechanisms that use PMU samples to obtain addresses used by memory reference operations and determine lockset information from instrumented lock and unlock operations. A lockset denotes the set of locks that a thread currently holds at a particular program point during the execution. A DRD mechanism can combine data from the PMU samples and lockset information to detect data races. In some implementations, the DRD mechanism can include a self-monitoring routine to determine virtual memory addresses based on memory reference data collected by the processor's PMU. During an offline analysis, the mechanism can determine additional memory references from the PMU data based on a static stimulation of at least a portion of the application.

Figure 1:
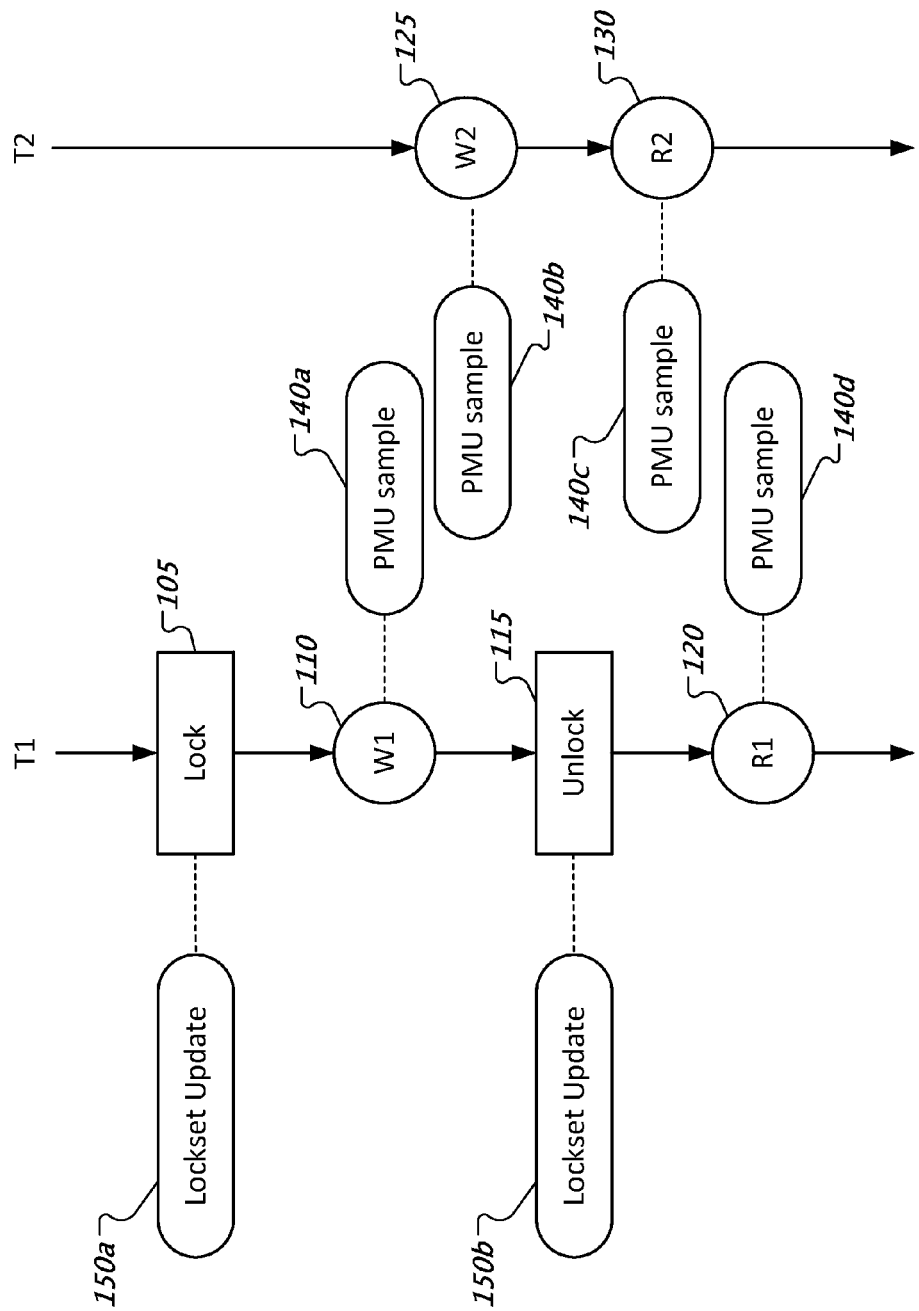
FIG. 1 shows an example of monitoring data associated with detecting a data race.

FIG. 1 shows an example of monitoring data associated with detecting a data race. In this example, a process running an application runs a first thread (T1) and a second thread (T2). The first thread T1 performs a lock 105, a write 110 to a memory location, an unlock 115, and a read 120. In some implementations, a lock 105 operation is based on a lock identifier. Based on a successful execution of the lock 105 by the first thread T1, a subsequent lock to the same lock identifier in another thread will block until the first thread T1 executes the unlock 115. Other types of synchronization operations (e.g., lock and unlock) are possible.

The second thread T2 performs a write 125 and a read 130. A data race may happen if T1's write 110 and T2's write 125 are to the same memory location. Note that T2's write 125 can be before or after T1's write 110, and the timing can be different for each running of the application. As depicted by FIG. 1, T1 performs a protected write to the memory location (e.g., a write that is covered by lock and unlock operations), whereas T2 performs an unprotected write to the memory location (e.g., a write that is not covered by lock and unlock operations). A DRD mechanism can cause a PMU to generate samples 140a, 140b, 140c, 140d for the memory operations (e.g., write 110, read 120, write 125, and a read 130). In this example, T1's lock 105 and unlock 115 operations are instrumented to cause a logging mechanism to capture lockset update events 150a, 150b for the respective operations. The DRD mechanism can analyze monitoring data, including the samples 140a-d and the lockset update events 150a-b to detect a data race.

Figure 2:
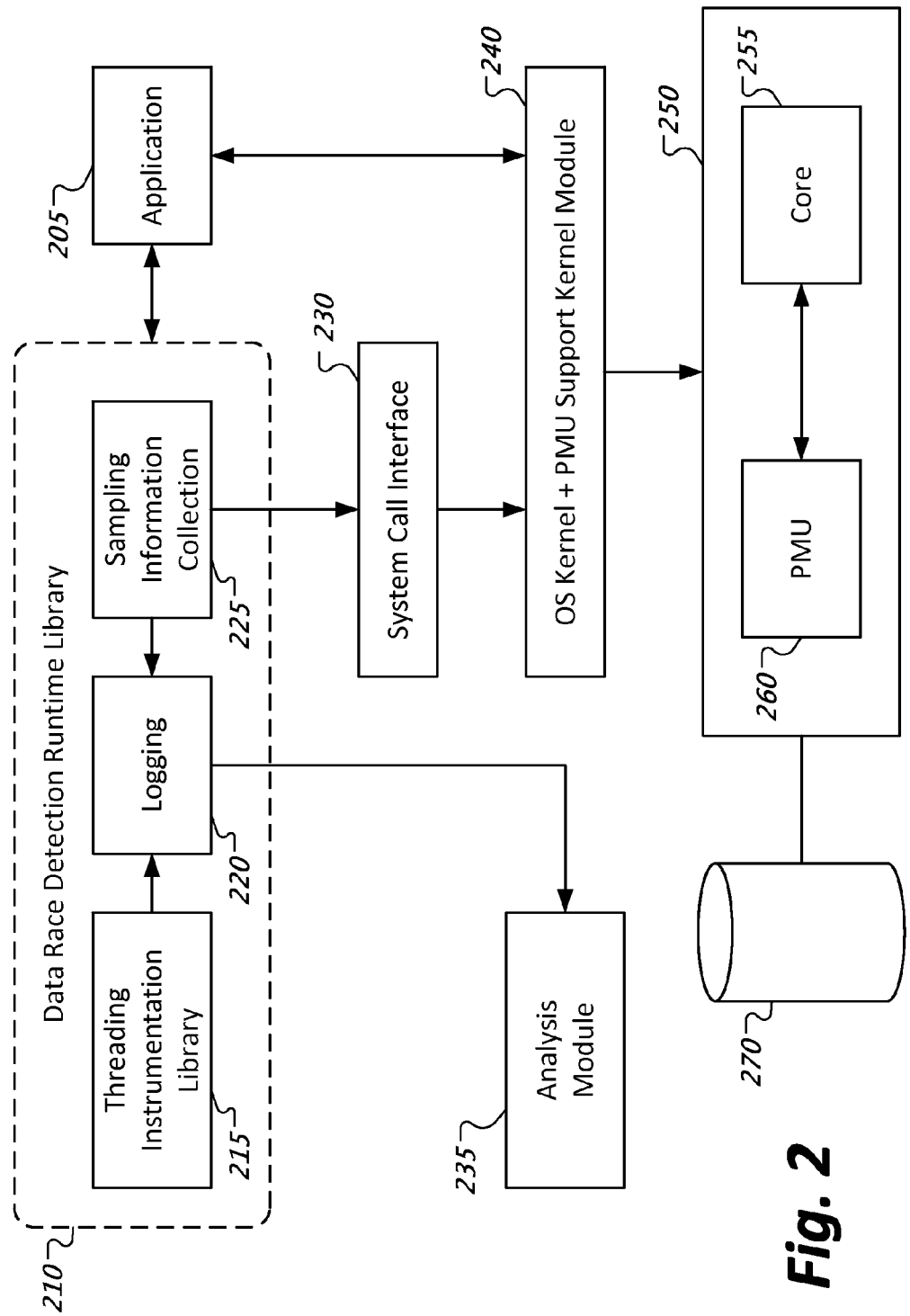
FIG. 2 shows an example of a data race detection system.

FIG. 2 shows an example of a data race detection system. A multithreaded program such as multithreaded application 205 is modified to interact with a DRD runtime library 210. The library 210 includes a threading instrumentation library 215, sampling information collection module 225, and a logging module 220. For example, the application 205 can be modified to call one or more routines in the threading instrumentation library 215 to provide information that determines locksets. The DRD runtime library 210 provides a lockset based DRD algorithm that track memory allocation events, memory reference events, lock events, unlock events, and memory de-allocation events. Memory allocation instrumentation can reduce the number of false positives in a DRD mechanism. The logging module 220 can log events in one or more file stored on a computer storage device 270. A logging entry can include a record number, a thread id (tid), an event type, and a stack trace for the event.

The operating system (OS) kernel 240 runs the application 205 on a processor 250. The processor 250 can include one or more processor cores 255 and one or more PMUs 260. In some implementations, the processor 250 runs two or more threads of the multithreaded application 205 in parallel on two or more processing cores. In some implementations, the processor 250 performs context switches among two or more threads of the multithreaded application 205. In some implementations, the core 255 includes the PMU 260. The sampling information collection module 225 uses a system call interface 230 to access PMU sampling data via the kernel 240. The kernel 240 uses a PMU support kernel module to communicate with the PMU 260. A computer storage device 270 (e.g., a hard disk drive (HDD), solid state drive (SSD), or random access memory (RAM)) can store one or more of the application 205, the DRD runtime library 210, or the kernel 240. The processor 250 can communicate with the computer storage device 270 via one or more buses.

An analysis module 235 can interpret the PMU sampling data and the instrumentation data to determine whether there is a data race condition. In some cases, a data race occurs when multiple threads access the same location, one or more of the threads does so without proper synchronization, and at least one of the accesses is a write. The analysis module 235 can perform memory address computations, optimizations, and data race detection. In some implementations, the analysis module 235 can use an assembly level analysis to compute final memory address from register value states.

Figure 3:
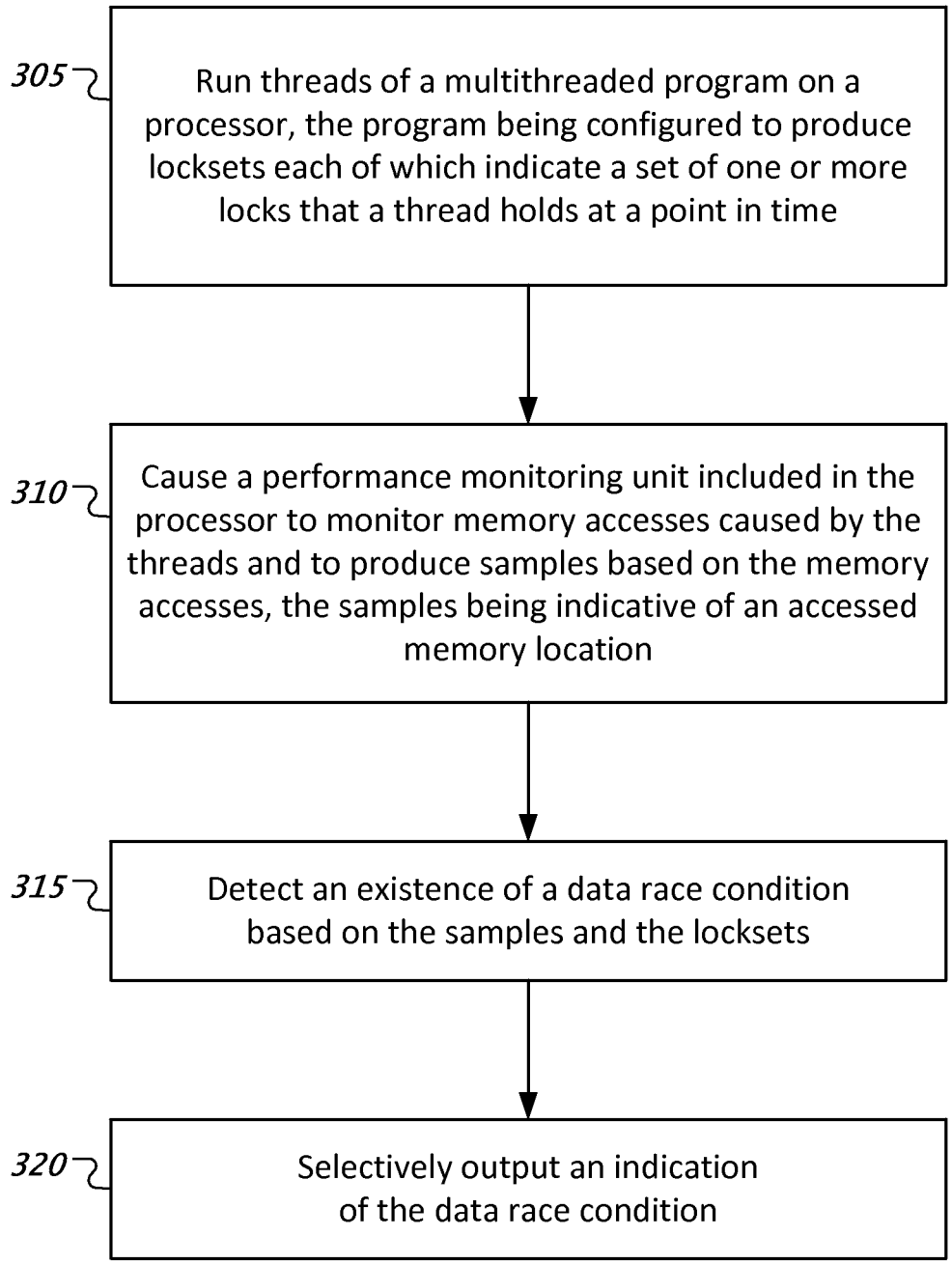
FIG. 3 shows an example of a data race detection process.

FIG. 3 shows an example of a data race detection process. A data race detection process runs threads of a multithreaded program on a processor, the program being configured to produce locksets each of which indicate a set of one or more locks that a thread holds at a point in time (305). Running threads of a multithreaded program can include running an instrumented version of the program that provides notifications such as a lock notification, an unlock notification, a memory allocation notification, and a memory de-allocation notification. Other notifications are possible. The process causes a PMU included in the processor to monitor memory accesses caused by the threads and to produce samples based on the memory accesses, the samples being indicative of an accessed memory location (310). For example, the process can write a pre-determined value to a processor register to trigger the PMU to start producing samples.

The data race detection process detects an existence of a data race condition based on the samples and the locksets (315). Detecting an existence of a data race condition can include identifying a protected access to a memory location by a first thread of the threads and identifying an unprotected access to the memory location by a second thread of the threads. The process selectively outputs an indication of the data race condition (320). Outputting an indication of the data race condition can include displaying a visual warning, highlighting, in a code browser window, program instructions that are associated with the data race condition, writing a log message to a file, or a combination thereof. In some implementations, detecting an existence of a data race condition can include aggregating performance monitoring unit data generated by running multiple instances of an application.

A data race detection process can perform offline analysis to determine addresses for additional memory operations that were not captured. In some implementations, a data race detection process can determine one or more memory accesses based on register file information included in a selected PMU sample and one or more associated basic blocks of the program, the selected sample corresponding to a memory reference instruction within the one or more associated basic blocks. Register file information can include values for a processor's registers. Detecting the existence of the data race condition can include using the one or more additional memory accesses.

The data race detection process can obtain memory allocation events associated with the program. Detecting the existence of the data race condition can include using at least a portion of the memory allocation events. Obtaining memory allocation events can include reading a log file with entries produced form instrumented memory allocation routines. The process can include controlling a sampling rate of the PMU based on an overhead parameter. In some implementations, the sampling rate can be controlled by a writing a value to a processor register associated with the PMU. The process can configure a size of a buffer of the performance monitoring unit to store a single sample such that an interrupt occurs based on the performance monitoring unit writing a single sample to the buffer.

A portion of the DRD mechanism can run as a component of a target application. In some implementations, at least a portion of the DRD mechanism resides in the same address space as the target application. A thread create function can be instrumented to produce a thread create event. Moreover, each thread can maintain a lockset in its own thread local storage and update the lockset for each lock or unlock event. In some implementations, thread libraries support a mechanism for users to traverse all live threads while a program is running. For example, a DRD mechanism can be enabled on running threads. To start collecting PMU samples, the DRD mechanism can register PMU contexts for each thread of the application by traversing live threads. In some implementations, the target application includes a toggle routine to toggle DRD monitoring on or off. For example, the toggle routine, running within an application, can listen for incoming toggle commands via a network port.

With DRD monitoring enabled, a thread instrumentation library can redirect synchronization calls to wrapper functions which update lockset information for each thread. At the same time, for each thread, a separate sampling information collecting phase retrieves memory address information whenever an instruction of that thread is sampled by the PMU. The PMU is accessed through a kernel system call interface. For each sample, the PMU generates processor interrupts which the kernel eventually transforms into an asynchronous signal delivered to the user application. In some implementations, a PMU record the register state of the processor with each sample. For example, in a first thread, can take a lock and write operation to memory location X. The write operation can be sampled by a PMU. The DRD mechanism can output a log record that includes the PMU sample. In some implementations, the DRD record includes the whole register value state information together with the currently held lockset {L} in the signal handler of the first thread. If a read operation to memory location X with an empty lockset is sampled by the PMU in a second thread, a DRD mechanism can generate a warning indicating an unprotected access to memory location X.

The PMU can be managed by the kernel and can be accessible via a system call interface. In some implementations, a PMU context can be identified by a file descriptor. Each thread creates a PMU context at startup. A PMU file descriptor can be used throughout a PMU session to operate on the PMU. In some implementations, a PMU session is started based on creating a PMU file descriptor.

In a PMU session, an event and a sampling period are selected. In some implementations, the Instruction_Retired event can be used. In the PMU session, sampling buffer sizes can be configured. The kernel manages a sampling buffer where samples are saved on PMU interrupts. The application is notified by a signal based on the buffer becoming full. In some implementations, DRD mechanism requires the memory address immediately after an instruction is sampled. In some implementations, the DRD mechanism uses a large sized buffer size and only uses the last entry. In some implementations, the DRD mechanism can set the buffer size to one (e.g., each PMU sample generates an interrupt because the buffer can only hold one entry).

Further in the PMU session, a kernel context for monitoring is created. Using the file descriptor, the DRD mechanism can program an event and sampling period. The file descriptor can be used to bind the signal to a thread. In the PMU session, the monitoring can be started. After setting all software and hardware flags, a separated system call is invoked to start the PMU monitoring. In some implementations, the system call sets a special enable bit in the PMU.

Yet further in the PMU session, PMU information can be read and the monitoring can be restarted. Once the signal notification is received, it is safe to read the samples directly in the buffer which is remapped into the user level address space. During notification, sampling is stopped. It must be restarted via a specific system call. The sampling period can be adjusted dynamically. The DRD mechanism can work within monitored programs, in a self-monitoring way. To achieve this, the PMU setup and start functions can be incorporated into a thread create wrapper function and the PMU reading and restarting can be added as a new signal handler function of the program.

When a memory access is sampled by a PMU, a DRD mechanism can obtain the sampled information via a signal handler of the monitored program. In some implementations, the asynchronous signal SIGIO can be used for signal delivery of PMU interrupts. The signal should be dispatched immediately after the hardware interrupt happened to aide in combining an aligning lockset data and memory access data. In some implementations, the signal is required to be dispatched to the thread in which the sample was captured.

A sampling based analysis method potentially misses information. For data race detection this means that memory accesses are only caught with a certain probability, there is no guarantee that a specific memory reference will be sampled. For the sampling based DRD techniques, a fundamental question to consider is this: given a fixed sampling period T and a dynamic instruction stream $\{I_1, I_2, \ldots I_i \ldots, I_s\}$, if two memory accesses involved in a race occur m and n times in the stream, respectively, what is the probability to catch both memory references at least once? To answer this question, we first compute the total number of samples as t=s/T. The probability P for catching a memory reference at least once is:

$$P = 1 - \frac{C^t_{s-m} + C^t_{s-n} - C^t_{s-m-n}}{C^t_s} \quad (1)$$

$$\approx 1 - \left(1 - \frac{m}{s}\right)^t - \left(1 - \frac{n}{s}\right)^t + \left(1 - \frac{m}{s} - \frac{n}{s}\right)^t$$

There are two assumptions for the approximation: The total number of instructions s is much larger than m and n, and the instructions are sampled independently. The first assumption is easy to understand because racy memory accesses only occupy a small part of the total instructions. The sampling period can be dynamically adjusted to model the independence of each sample event. As an application of the above equation, for the pair {s=1,000,000,000, T=200,000, m/s=0.01%, n/s=0.01%}, t is computed to be 5000 and the final probability is 15.5%. Equation (1) indicates directions to increase the probability: (i) increase m/s and n/s or (ii) enlarge t. Given a fixed total number of instructions s, the former tells us that if we can get more occurrences for each racy memory access, the probability is increased. The latter shows that the probability can be increased by increasing t by increasing s or reducing T.

As equation (1) shows, an intuitive way to increase the probability is to reduce the sampling period, getting more samples overall. However, the overhead of sampling is proportional to the number of hardware interrupts. The shorter we set the sampling period, the larger the number of hardware interrupt will be, and with it the runtime overhead as well. A DRD mechanism can dynamically adjust the sampling period according to an overhead budget. An overhead budget can be set by a performance based requirement for an application. For example, a user can configure an overhead budget parameter to be no larger than 10% of original application performance. In some implementations, the DRD mechanism can reduce the sampling period based on overhead budget. In some implementations, the DRD mechanism can obtain two samples for one hardware interrupt.

Figures 4A, 4B:
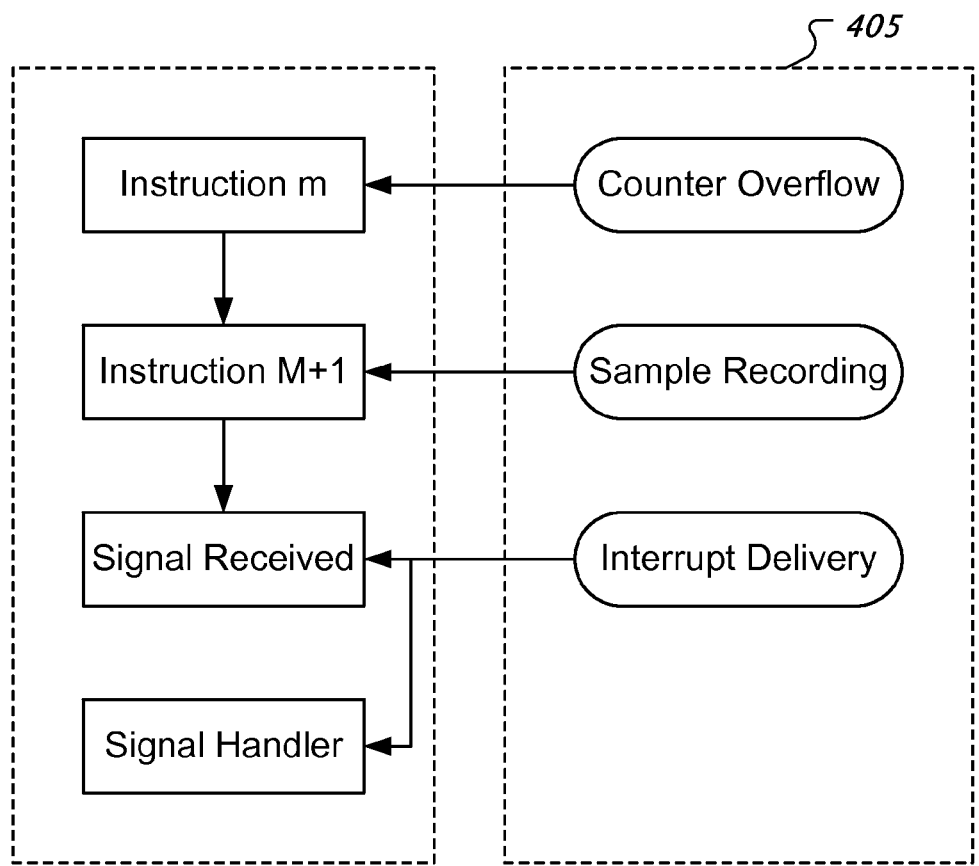
FIGS. 4A and 4B show an example of a signal skid problem.

FIGS. 4A and 4B show an example of a signal skid problem. FIG. 4A shows an example of the layout of the signal skid problem. Operations 405 of PMU can include triggering a buffer counter overflow, sample recording, and triggering an interrupt delivery of one or more PMU signals. A signal handler mechanism, in some implementations, can produce two samples for each hardware interrupt. In a signal skid problem, if the retirement of instruction m causes a counter overflow, PMU may not record the information at once until the next instruction retired event occurs. PMU will can record the register values for instruction m+l. After the sample recording, the PMU hardware logic can generate a hardware interrupt immediately and user threads can be suspended. There can be latency between instruction m+l and the place where user level code finally receives the signal.

FIG. 4B shows an example of a code sequence example to further show the signal skid problem. In the case when IP1 is instruction m+l, the signal can be received at IP2, in this case, the lockset at these two places are different. The situation is same when the m+l is IP3 but the signal comes in at or after IP4. To overcome this problem, one or more NOPs (no-op operations) can be inserted in the lock/unlock instrumentation code to ensure that samples of instructions outside of critical section will not skid into the critical section and samples of instructions inside critical section will not bypass the unlock operations. Inserting NOPs can produce overhead; however, the inserted NOPs can increase the number of samples that are collected. That is, while PMU maintains a set of register states for m+l, the OS also maintains another set of register states for the instruction when it is suspended by kernel. These two sets of register states should be same if there is no signal skid problem. If there is a signal skid problem, we may get two sets of register states.

Another technique for increasing the probability of detection is by increasing the number of sampled instructions via offline static instruction simulation. A DRD mechanism can perform offline analysis to compute the final memory address based on the set of register states. The DRD mechanism can perform static instruction simulation based on the current register states. Static instruction simulation is conducted based on static data flow analysis. Based on a set of registers value for an instruction i, the mechanism can use these registers value to compute memory address for another instruction j if the registers are not invalidated between i and j. For instance, based on sampling IP1 in FIG. 4B, the DRD mechanism can use, for example, the register value of rax at the IP1 to compute memory address of instruction at IP2 through forward computation, given that the value of register rax is not killed by the instruction at IP1. Based on obtaining the registers value state for the instruction at IP3, the DRD mechanism can compute the memory address of instruction at IP2 through backward computation. The DRD mechanism can perform forward and backward memory address computations within a basic block boundary. In some implementations, a PDU data collection mechanism can use a branch trace buffer (BTB) to retrieve branch taken and instruction retired information to increase the probability of detecting data race conditions. In some implementations, the DRD mechanism can perform supports forward and backward memory address computation within multiple basic blocks using branch information, such as branch-taken or branch-not-taken information.

Still another technique for increasing the probability of detection is by increasing the total number of instructions, aggregating samples, or both. Typical server applications are running for a long time once they have been deployed. For example, a multithreaded http server process can be configured to run one listener thread and large number of worker threads. The listener thread is responsible for listening to the incoming requests and dispatching the tasks into worker threads. In that case, the worker threads execute the same sequences of binary code. In other words, more queries the server received, more times an instruction will be executed. In a production environment, the same multithreaded program may be deployed on tens or hundreds of machines. In that case, after aggregating large number of samples from long time constantly monitoring on different machines, the probability of detecting a data race can be increased based on aggregating samples from multiple instances of the same application.

The performance of a DRD mechanism can be evaluated. Experiments were conducted on a machine with a 2.40 GHz Intel Core 2 Q6600 processor, and 4 GB of memory, that is configured to run a Linux kernel, version 2.6.30, with a perfmon2 kernel patch. As shown in Table 1, multiple versions of applications with known data races were evaluated including a web server (Apache httpd), a database server (MySQL), and a Test benchmark. The Test benchmark includes a loop and each iteration of the loop contains a global variable access among a large number of instructions. Seven bugs from the applications were extracted as shown in Table 1. For each race, we classify it into 3 categories: Harmful, Benign, and False. For the httpd server, its performance testing script ab can be used as the client to generate queries. For the mysqld server, its testing script under mysql-test can be used to produce detection inputs and the script under sql_bench can be used as the overhead testing input.

TABLE 1

Known Bugs.

| Bench | Bug No | Type | Description |
|---|---|---|---|
| Test | 1 | Benign | update the same global variable in two threads |
| httpd | 1 | Harmful | Bug id: 44402, race in fdqueue.c |

TABLE 1-continued

Known Bugs.

| Bench | Bug No | Type | Description |
|---|---|---|---|
| | 2 | Benign | update requests_this_child in worker.c |
| | 3 | False | false positives in apr_pool.c |
| mysqld | 1 | Harmful | Bug id: 28249 |
| | 2 | Benign | Benign race for function statistic_increment |
| | 3 | False | false positives in thr_lock.c |

To evaluate the performance of a DRD mechanism, experiments are designed based on the following evaluation methodology. The following four steps can be repeated for each data race bug: (1) characterize a bug, (2) determine an Experiment Unit, (3) run experiments and determine the experiment probability, and (4) evaluate the effect of optimizations. An Experiment Unit is defined based on the number of obtained samples, e.g., the t in equation (1). The DRD mechanism can run the program longer to get more samples. For example, for httpd and mysqld server, the DRD mechanism can make them serve more requests from clients. The experiments include repeating the Experiment Unit several times and each of the Experiment Units will report if it catches the race or not.

For characterizing a bug, a metric Execution Unit denotes a sequence of dynamic instructions. Execution Unit for an application and a data race are defined separately. The Execution Unit for an application (EUA) denotes the total number of instructions executed to finish a unit task, while the Execution Unit for a data race (EUR) denotes the total number of instructions executed to expose that race. The EUA can be matched with several runtime paradigms. For example, a worker thread of http server executes the same sequence of instructions when serving queries where we treat the number of executed instructions to serve a http query as an EUA. The Test benchmark includes a loop and each iteration of the loop contains a global variable access among a large number of instructions. In that case, the DRD mechanism can treat the number of instructions for a single iteration as an EUA. However, some races can only be exposed by executing several EUA for different threads. In some cases, the EUR can be a multiple of EUA. The DRD mechanism can use an external PMU tool to obtain the value of EUA for a specific application. The EUR can be to compute the m/s and n/s in equation (1). For example, for a httpd bug, the length of the EUR is 50,000 instructions and only one occurrence of a racy memory access is involved in this EUR, this yields a m/s=0.002%. Note that this number will not change since both n and s will increase consistently based on running the program longer.

TABLE 2

Overall Detection Results for T = 200,000.

| | Experiment | | | | Running result | | |
|---|---|---|---|---|---|---|---|
| Bugs | EUR (instructions) | m/s, n/s | Unit (samples) | Theoretical result | Base | OS Sample | Offline Ext. |
| Test | 80,000 | 0.00125%, 0.00125% | 10,000 | 1.4% | 1% | 3% | 7% |
| httpd-1 | 1,000,000 | 0.0001%, 0.0001% | 8,000 | 0.6% | 1% | 3% | 4% |
| httpd-2 | 50,000 | 0.002%, 0.002% | 8,000 | 2.1% | 1% | 3% | 5% |
| httpd-3 | 50,000 | 0.002%, 0.002% | 6,000 | 1.3% | 2% | 4% | 4% |
| mysqld-1 | 120,000 | 0.0008%, 0.0008% | 20,000 | 2.1% | 2% | 4% | 9% |
| mysqld-2 | 80,000 | 0.00125%, 0.00125% | 10,000 | 1.4% | 1% | 2% | 3% |
| mysqld-3 | 80,000 | 0.00125%, 0.00125% | 10,000 | 1.4% | 3% | 6% | 8% |

Based on the evaluation methodology, Table 2 provides the overall Detection Result for T=200,000. The ratios of m/s and n/s are the proportions for racy memory accesses among total instructions. The Experiment Unit is defined based on the number of samples that is equal to s/T. The OS Sample is an optimization that can produce an additional sample in the OS in addition to the PMU sample. The Offline Ext. result is reported by adding the OS sample optimization. With special input and custom thread scheduler, in theory, these bugs can be caught by a full instrumentation based race detection technique. However, the DRD mechanism can catch data race conditions with a probability. The OS Sample column denotes the result after applying the optimization that can get another sample from OS in addition to the PMU sample. The Offline Ext column reports the result for offline sample extension optimization. From the result, the DRD mechanism can catch bugs with a close probability to theoretical result. The values of m/s and n/s for most of studied bugs are around 0.001%, which means every 100,000 instructions will execute racy memory accesses once. Take httpd-2 bug as an example, for each query in one thread, they will execute the racy memory access once. Such proportional values of m/s and n/s indicates that the two racy memory accesses should both locate in hot regions. A data race with hot-hot pattern can be caught by a DRD mechanism. A DRD mechanism can use increase monitoring time to potentially detected data races with a hot-cold pattern.

Figure 5:
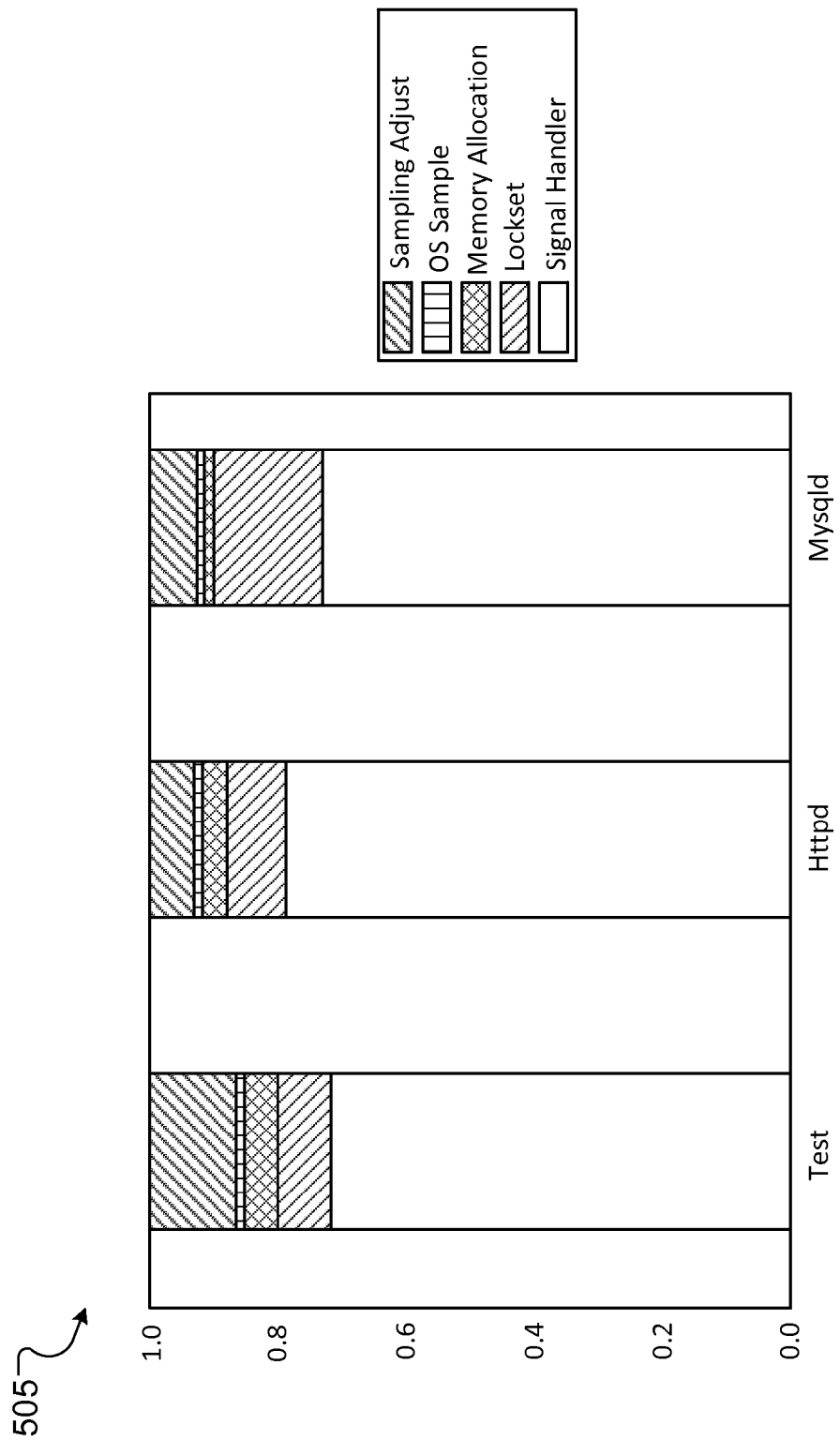
FIG. 5 show the breakdown of different types of overheads associated with a data race detection mechanism.

FIG. 5 show the breakdown of different types of overheads associated with a data race detection mechanism. For three different benchmarks, the graph 505 of FIG. 5 shows different types of overhead such as a sampling adjust overhead, an OS sample overhead, memory allocation overhead, lockset overhead, and signal handler overhead. The average slow down at T=200,000 is 2.8% which is practical for production usage. Note that, at T=20,000, the slow down quickly increases to 30%.

As shown by the graph 505, the overhead of runtime monitoring mainly comes from two parts: lockset instrumentation and signal delivery. Out of these two, signal handler processing is the major source of overhead. Signal handler processing requires several OS system calls to interrupt user level code and read the information from OS kernel and hardware. The overhead of sampling adjust is moderately high because it invokes system calls to set the hardware control bits. The OS sample incurs a very small overhead. The overhead of lockset instrumentation is determined by the lock usage of different benchmarks. Since mysqld uses much more locks to protect concurrent accesses of the same table, its overhead is higher than the other two benchmarks. The Test benchmark includes a number of lock/unlock and memory allocation functions to study the breakdown of the overhead.

Figure 6:
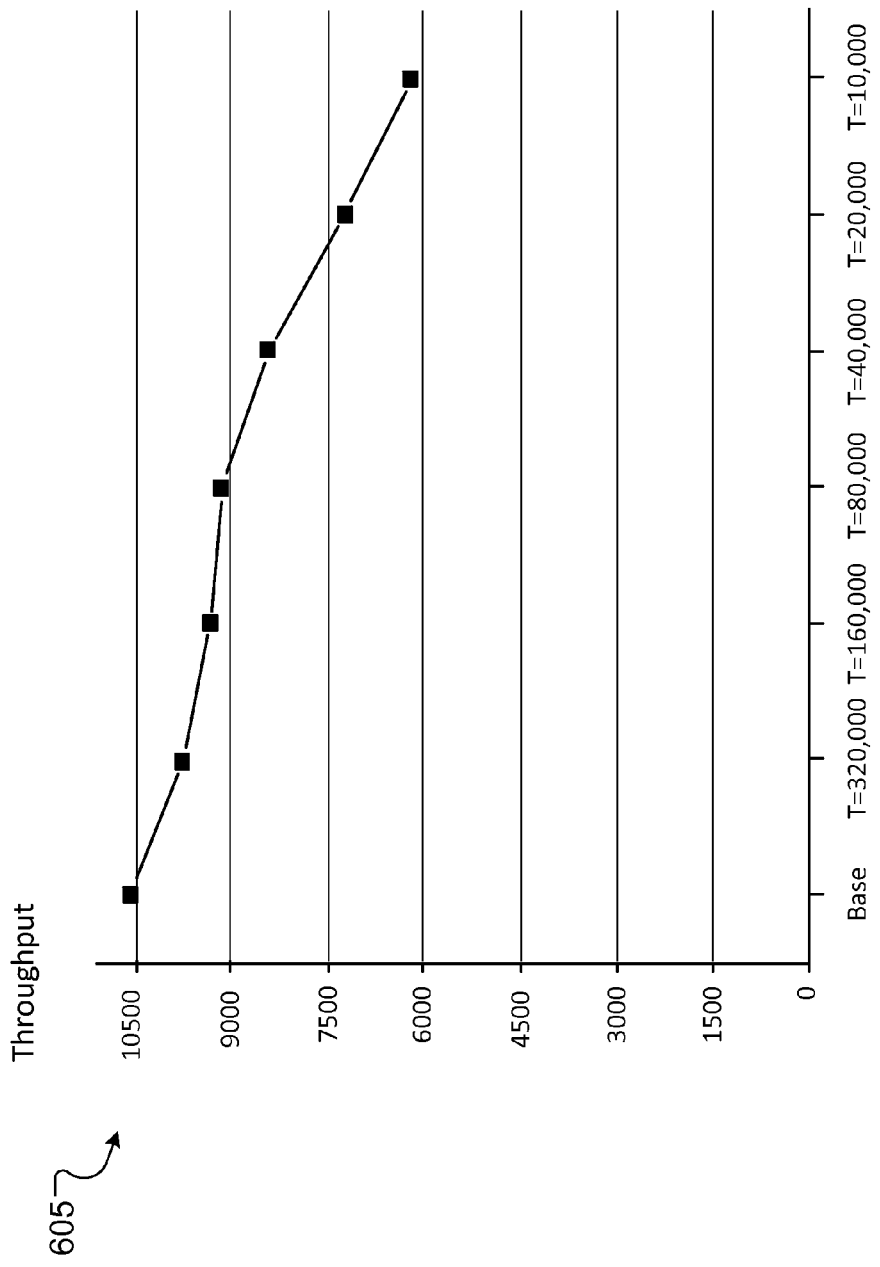
FIG. 6 shows an example of throughput performance for a benchmark application being monitored by a data race detection mechanism.

FIG. 6 shows an example of throughput performance for a benchmark application being monitored by a data race detection mechanism. In this example, the benchmark application is httpd. The input is fixed at 100,000 requests in total. The graph 605 of FIG. 6 shows the throughput for different sampling periods, where the x-axis is the sampling period and y-axis is the throughput result, e.g., requests per second. The graph 650 shows that the overhead, as reflected by throughput, is nearly linear with sample period. This is because the overhead is mainly determined by the number of hardware interrupts which is controlled by sampled period as the graph 505 of FIG. 5 shows.

Figure 7:
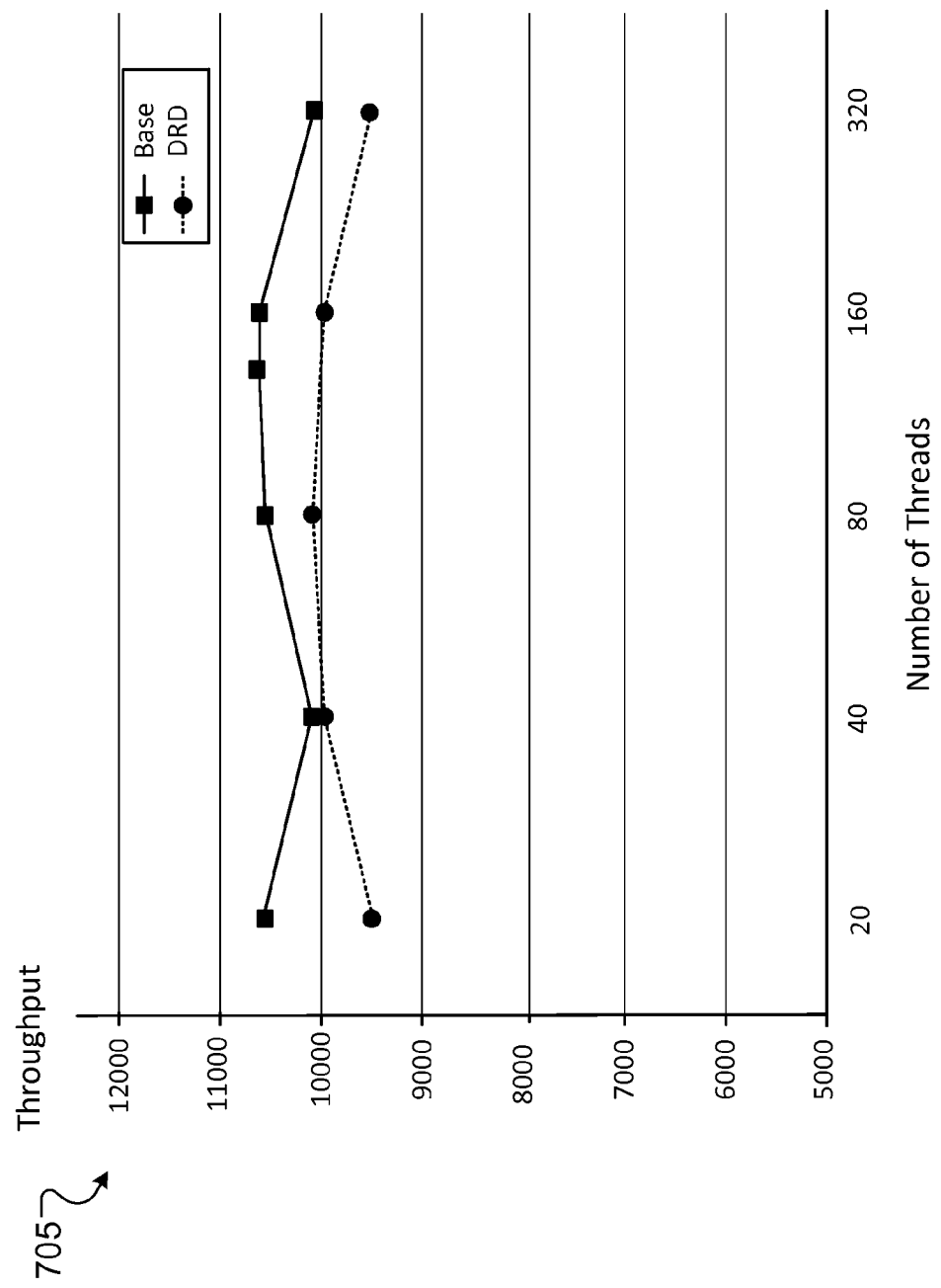
FIG. 7 shows another example of throughput performance for a benchmark application being monitored by a data race detection mechanism.

FIG. 7 shows another example of throughput performance for a benchmark application being monitored by a data race detection mechanism. In this example, the benchmark application is httpd and the sampling period is fixed with T=200,000. The graph 705 of FIG. 7 shows the throughput for different number of threads running in the benchmark application, where the x-axis is the number of threads and the y-axis is the throughput result, e.g., request per second. The graph 705 of FIG. 7 shows the base performance of the benchmark application ("BASE") and the DRD instrumented version of the benchmark application ("DRD"). Typically, a large server application will initialize large number of threads during startup and put them into a thread pool for later use. The result in FIG. 7 shows that the number of threads as minimal impact for the performance of a DRD mechanism. This is because PMU only affects scheduled threads. If one thread is switched out by kernel and does not run on any of cores in CPU, the PMU will not sample it. The final number of hardware interrupts is only determined by the number of concurrent running threads on CPU which is again controlled by the number of physical CPU cores. Using one or more kernel modules to maintain a context for each thread, a DRD mechanism may require increased OS kernel resources, such as locked memory, in order to monitor applications which have a large number of threads.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, comprising:
running two or more threads of a multithreaded program on a processor, the program being configured to:
produce locksets, each of which indicate a set of one or more locks that a thread holds at a point in time; and
cause a hardware implemented performance monitoring unit included in the processor to i) monitor memory accesses caused by the threads, ii) produce samples based on the memory accesses, each sample indicating an accessed memory location, wherein a sampling rate of the samples is controlled based on an overhead parameter, and iii) produce a separate processor interrupt for each sample;
aligning, using each separate processor interrupt produced for each sample by the performance monitoring unit, the samples produced by the performance monitoring unit with locksets produced by the program; and
determining an existence of a data race condition based on the samples and the locksets, the determining comprising:
(i) identifying, from a first lockset of the locksets and a first sample of the samples produced for a first thread of the two or more threads, a protected access, by the first thread, to a memory location indicated by the first sample;
(ii) identifying, from the first lockset and a second sample of the samples produced for a second thread of the two or more threads, an unprotected access, by the second thread, to the memory location indicated by the second sample; and (iii) determining the data race condition exists based on the identified protected access and the identified unprotected access; and selectively outputting an indication of the data race condition.

2. The method of claim 1, further comprising:

selecting a sample of the samples;

determining one or more additional memory accesses based on (i) register file information included in the selected sample and (ii) one or more associated basic blocks of the program, the selected sample corresponding to a memory reference instruction within the one or more associated basic blocks, wherein detecting the existence of the data race condition comprises using the one or more additional memory accesses.

3. The method of claim 1, further comprising:

obtaining memory allocation events associated with the program, wherein detecting the existence of the data race condition comprises using at least a portion of the memory allocation events.

4. The method of claim 1, further comprising:

configuring a size of a buffer of the performance monitoring unit to store a single sample such that each processor interrupt occurs based on the performance monitoring unit writing a single sample to the buffer.

5. The method of claim 1, wherein running the threads comprises running multiple instances of the application on one or more servers, and wherein detecting the existence of the data race condition comprises aggregating performance monitoring unit data generated by running the multiple instances of the application.

6. A system, comprising:

a computer storage device having instructions stored thereon; and a processor coupled to the computer storage device, the processor comprising a performance monitoring unit, wherein the instructions, when executed by the processor, cause the processor to perform operations comprising:

running two or more threads of a multithreaded program on a processor, the program being configured to:

produce locksets, each of which indicate a set of one or more locks that a thread holds at a point in time; and cause a hardware implemented performance monitoring unit included in the processor to i) monitor memory accesses caused by the threads, ii) produce samples based on the memory accesses, each sample indicating an accessed memory location, wherein a sampling rate of the samples is controlled based on an overhead parameter, and iii) produce a separate processor interrupt for each sample;

aligning, using each separate processor interrupt produced for each sample by the performance monitoring unit, the samples produced by the performance monitoring unit with locksets produced by the program; and determining an existence of a data race condition based on the samples and the locksets, the determining comprising:

(i) identifying, from a first lockset of the locksets and a first sample of the samples produced for a first thread of the two or more threads, a protected access, by the first thread, to a memory location indicated by the first sample;

(ii) identifying, from the first lockset and a second sample of the samples produced for a second thread of the two or more threads, an unprotected access, by the second thread, to the memory location indicated by the second sample; and (iii) determining the data race condition exists based on the identified protected access and the identified unprotected access; and selectively outputting an indication of the data race condition.

7. The system of claim 6, the operations further comprising:

selecting a sample of the samples;

determining one or more additional memory accesses based on (i) register file information included in the selected sample and (ii) one or more associated basic blocks of the program, the selected sample corresponding to a memory reference instruction within the one or more associated basic blocks, wherein detecting the existence of the data race condition comprises using the one or more additional memory accesses.

8. The system of claim 6, the operations further comprising:

obtaining memory allocation events associated with the program, wherein detecting the existence of the data race condition comprises using at least a portion of the memory allocation events.

9. The system of claim 6, the operations further comprising:

configuring a size of a buffer of the performance monitoring unit to store a single sample such that each processor interrupt occurs based on the performance monitoring unit writing a single sample to the buffer.

10. The system of claim 6, wherein running the threads comprises running multiple instances of the application on one or more servers, and wherein detecting the existence of the data race condition comprises aggregating performance monitoring unit data generated by running the multiple instances of the application.

11. A non-transitory computer readable medium encoded with a computer program, the program comprising instructions that when executed by data processing apparatus cause the data processing apparatus to perform operations comprising:

running two or more threads of a multithreaded program on a processor, the program being configured to:

produce locksets, each of which indicate a set of one or more locks that a thread holds at a point in time; and cause a hardware implemented performance monitoring unit included in the processor to i) monitor memory accesses caused by the threads, ii) produce samples based on the memory accesses, each sample indicating an accessed memory location, wherein a sampling rate of the samples is controlled based on an overhead parameter, and iii) produce a separate processor interrupt for each sample;

aligning, using each separate processor interrupt produced for each sample by the performance monitoring unit, the samples produced by the performance monitoring unit with locksets produced by the program; and determining an existence of a data race condition based on the samples and the locksets, the determining comprising:

(i) identifying, from a first lockset of the locksets and a first sample of the samples produced for a first thread of the two or more threads, a protected access, by the first thread, to a memory location indicated by the first sample;

(ii) identifying, from the first lockset and a second sample of the samples produced for a second thread of the two or more threads, an unprotected access, by the second thread, to the memory location indicated by the second sample; and (iii) determining the data race condition exists based on the identified protected access and the identified unprotected access; and selectively outputting an indication of the data race condition.

12. The computer readable medium of claim 11, the operations further comprising:

selecting a sample of the samples;

determining one or more additional memory accesses based on (i) register file information included in the selected sample and (ii) one or more associated basic blocks of the program, the selected sample corresponding to a memory reference instruction within the one or more associated basic blocks, wherein detecting the existence of the data race condition comprises using the one or more additional memory accesses.

13. The computer readable medium of claim 11, the operations further comprising:

obtaining memory allocation events associated with the program, wherein detecting the existence of the data race condition comprises using at least a portion of the memory allocation events.

14. The computer readable medium of claim 11, the operations further comprising:

configuring a size of a buffer of the performance monitoring unit to store a single sample such that each processor interrupt occurs based on the performance monitoring unit writing a single sample to the buffer.

15. The computer readable medium of claim 11, wherein running the threads comprises running multiple instances of the application on one or more servers, and wherein detecting the existence of the data race condition comprises aggregating performance monitoring unit data generated by running the multiple instances of the application.

* * * * *